Figure 2:
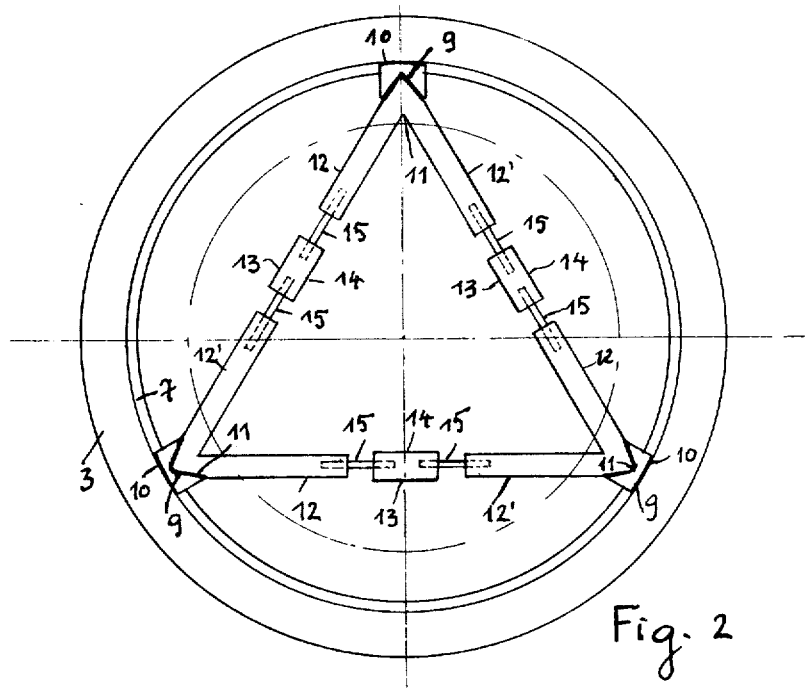

United States Patent
Pineur

[11] 3,890,694
[45] June 24, 1975

[54] DEVICE FACILITATING THE POSITIONING OF A PIPE COUPLING

[76] Inventor: Gilbert Pineur, Avenue A. Sonck 3, 4280 Hannut, Belgium

[22] Filed: May 1, 1974

[21] Appl. No.: 466,075

[30] Foreign Application Priority Data
May 4, 1973 Belgium ............................ 799088

[52] U.S. Cl. ............... 29/450; 29/200 J; 29/200 P; 29/237; 269/48.1; 285/23; 285/27; 403/43
[51] Int. Cl. ........................................... B23p 11/02
[58] Field of Search ................. 285/18, 23, 24, 27; 403/43, 44, 45, 46; 138/112, 113, 114; 29/450, 451, 200 J, 200 P, 237, 200 R; 269/48.1

[56] References Cited
UNITED STATES PATENTS

| | | | |
|---|---|---|---|
| 2,133,036 | 10/1938 | Moricle .......................... | 269/48.1 |
| 3,149,597 | 9/1964 | Brasfield et al. ............... | 269/48.1 X |
| 3,197,195 | 7/1965 | Work et al. .................... | 269/48.1 X |
| 3,327,379 | 6/1967 | Clements ....................... | 29/450 |
| 3,387,761 | 6/1968 | Pickard ......................... | 29/200 P |

FOREIGN PATENTS OR APPLICATIONS
1,090,052   10/1954   France ............................. 269/48.1

*Primary Examiner*—Richard J. Herbst
*Assistant Examiner*—Victor A. DiPalma
*Attorney, Agent, or Firm*—Robert E. Burns; Emmanuel J. Lobato; Bruce L. Adams

[57] ABSTRACT

The present disclosure relates to a device permitting the fitting onto a first pipe of a coupling, constituted as a single piece in which there are generally seated two sealing rings and, in a circumferential median groove, an expansion joint or seal, and the fitting of a second pipe onto this coupling positioned on the first pipe, and relates especially to the coupling of large diameter pipes such as are commonly used in public drainage works, water supply sustems, waste disposal systems pipelines or the like.

5 Claims, 2 Drawing Figures

DEVICE FACILITATING THE POSITIONING OF A PIPE COUPLING

The difficulties involved at the present time in the exact positioning of a coupling onto a pipe are well known; such difficulties occur simply because one of the sealing rings of elastic material quite commonly impedes the driving of the coupling onto the pipe, thus necessitating the use of traction means or striking weights of considerable size to effect this driving; such heavy devices are not conducive to the accuracy desired to regulate the driving operation, whereas it is necessary for the internal circumferential groove and the expansion joint seated therein to be positioned just at the end of the pipe; if this is not achieved, the joint will be crushed and indeed damaged and will no longer be able to fulfil its function. It will therefore be necessary to replace the joint or seal, thus necessitating its removal, an operation which cannot be carried out without difficulty and which frequently results in the joint becoming unserviceable and necessitates both its replacement and the replacement of the sealing ring.

It will be readily understood that the same difficulties and consequent accidents can also arise during the driving of the second pipe onto a coupling which has already been placed upon a first pipe.

In order to overcome these disadvantages it has already been envisaged that there may be placed on the first pipe, before the driving of the coupling, an abutment collar which limits this driving to a predetermined distance, but quite apart from the difficulties encountered in ensuring that this collar grips upon the first pipe, the operations of placing it and of removing it after use necessitate an access space all around the first pipe; it is moreover well known that such pipes are placed in trenches which are commonly of substantial depth.

Moreover, since it is not possible for the resultant of the traction force to be exerted in a uniformly distributed manner around the entire circumferential perimeter of the coupling and the pipe, nor for the striking blows to be applied simultaneously around this same perimeter, the collar frequently slides over a circular portion, thus inevitably leading to incorrect positioning of the coupling, the central axis of which is then no longer perfectly in alignment with the central axis of the pipes.

The present invention overcomes these various disadvantages, by ensuring with certainty exact positioning of the coupling between two pipes by means of a device composed:

1. of at least three plates of metal or other hard material such as wood, the thickness of which is slightly less than the width of the groove in the coupling, and the surface area of which is sufficient to ensure that, while it is positioned within the groove, it extends beyond the internal diameter of the pipes to be coupled;

2. Plates fixed to metal corner pieces, the angle of which is determined by the number of metal plates, being 60° for three plates, 90° for four plates, 120° for six plates and so on, so that it is possible to align one arm of one corner piece with one arm of the adjacent corner piece, the length of these arms and of these corner pieces being however always less than one half of the distance between two adjacent fixing points of the corner pieces onto the plates; except however if provision should be made for one arm of one corner piece to engage onto or into the arm of the adjacent corner piece.

3. Of a means permitting in succession the carrying out of an extension and of a contraction, such means being positioned between each of the arms of the mutually aligned corner pieces, and intended for progressively separating one of said arms from the other at the time when the plates are placed in the groove of the coupling and, conversely, for progressively bringing these arms together in order to withdraw the plates from the groove of the coupling; such means may be of known type such as a tie bar having screw threads of opposed pitch (a turnbuckle), a ratchet jack, hydraulic jack or the like.

Figure 1:
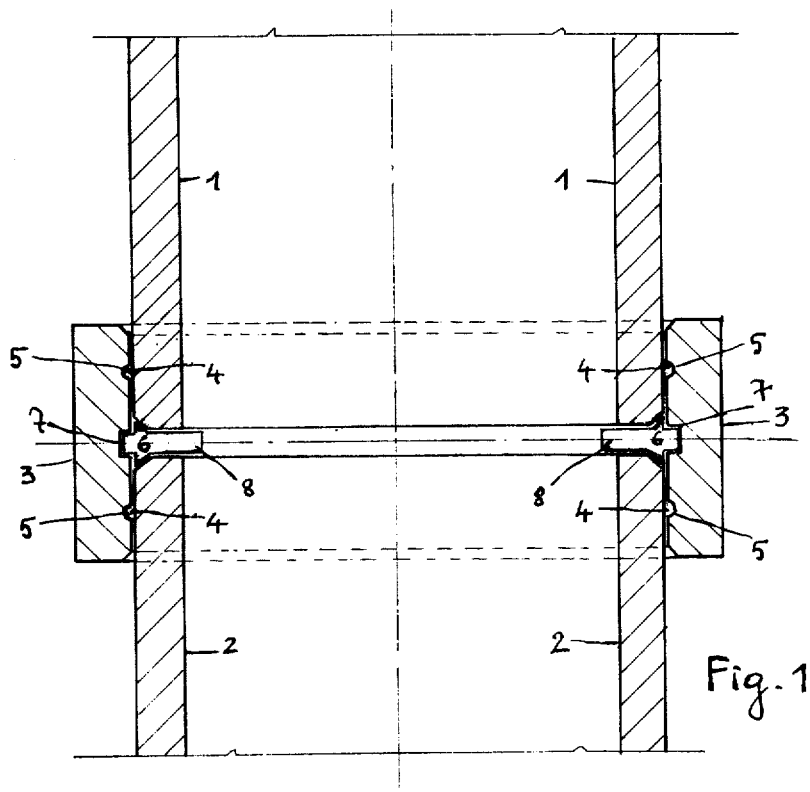

In order to facilitate the better understanding of the device forming the subject of this invention and to enable its characteristics and advantages to be made apparent, it will now be described with reference to the attached drawing, which shows diagrammatically:

FIG. 1, a longitudinal median sectional view through a coupling positioned between two pipes and FIG. 2, an enlarged front view of the coupling illustrated in FIG. 1, in which the device can be seen in position in the coupling.

Referring to FIG. 1, the reference 1 designates the first pipe, 2 the second pipe, 3 the coupling, 4 the two sealing rings seated in two small lateral grooves 5, and 6 the expansion joint or seal itself seated in the median groove 7 of the coupling 3.

The sealing rings 4 are of course in one piece and adopt a position around the entire circumference of the grooves 5, but the form illustrated is solely an example and does not concern the subject of this invention; the same is true of the expansion joint 6 which is usually provided in the form of a certain number of portions of a ring, of which the tongue 8 forms an elastic stop and covers a certain number of positions on the circumference of the two pipes 1 and 2.

FIG. 2 shows a three-part device, a preferred form of the invention which is particularly simple and which proves easy to place, composed on the one hand of three metal plates 9, of a thickness slightly less than the width of the groove 7 of the coupling 3, the length of which plates may vary but is nevertheless sufficient to give a satisfactory seating at the curved edge 10 of the plates 9, and the height of which is sufficient for the lower edge 11 to extend beyond the internal diameter of the pipes 1 and 2.

In addition, three corner pieces each having two arms 12, 12', of tubular metal, plates or rounds, fixed to the plates 9; between the arm 12 of one corner piece and the arm 12' of the other corner piece there is placed at each such position a tie bar 13 consisting of a sleeve 14, into which engage two threaded rods 15 having screw threads of opposite pitch, fixed to the arms 12 and 12'; when this sleeve 14 is rotated in one direction, it brings together the arm 12 and the arm 12' which is in alignment with it.

The length of the sleeve 14 of the threaded rods 15 being sufficient completely to thrust the metal plates 9 into the groove and to withdraw them within a circle slightly less than the internal diameter of the pipes 1 and 2.

As already indicated, these tie bars 13 could be substituted by screw jacks, hydraulic jacks or other means enabling the same result to be achieved, this result being the progressive insertion and withdrawal of the plates 9.

It has been indicated that the corner pieces 12, 12' were fixed to the metal plates 9; they need not however necessarily be in one piece with the corner pieces 12, 12', nor welded to these corner pieces, but it is important that they shall not in any way be capable of pivoting on the corner pieces and consequently, fixing by means of two bolts would for instance be perfectly suitable.

The method of use of a device such as described or of its possible variants will be readily understood:

After the diameter of the circle within which the external edge 10 of the plates is inscribed has been reduced to a value less than the smallest internal diameter of the coupling 3, the plates 9 are first positioned opposite the central groove 7 of the coupling 3 and then, by operating successively and progressively upon the tie bars 13, the plates 9 are introduced into the groove 7.

The coupling 3 is now ready for positioning upon the first pipe 1; this is carried out by the usual traction or pressure means but in any case, as a result of the use of the device, the coupling 3 does not move beyond its ideal position. In fact, the plates 9 of necessity limit the driving of the coupling 3 onto the pipe 1.

The device is kept in place during the driving of the second pipe 2, which will also be limited by the same plates 9.

After these various operations have been carried out, the device is withdrawn, by operating in succession and progressively in the reverse manner from that of the first occasion upon the tie bars 13, which now withdraw the plates 9 from the grooves 7 and from between the two ends of the pipes.

As soon as the separate plates are situated beyond the internal diameter of the pipes, it is easy to remove the device.

As described, the device is light and can be readily made demountable, by the very nature of its triangular, square, hexagonal or other shape; it leaves the centre of the pipes and of the coupling clear and therefore does not interfere with the traction cable provided for driving the coupling and the second pipe.

The invention is of course not limited to the form of embodiment described above or shown on the attached drawing; it would not constitute a departure from its scope to apply to it modifications and improvements, provided that they are not in contradiction to the claims given below; in particular, it would be possible to provide corner pieces in which the lengths of the arms of one corner piece differ from those of the arms of another corner piece, or the length of one arm and the other arm of the same corner piece differ, provided that it is possible to align them as indicated above and to decrease or increase the distance between the adjacent plates within the minimum limits indicated above and by means of the use of the various extension and contraction means which are possible.

I claim:

1. A device for positioning a single-unit pipe coupling onto pipes and for positioning pipes into a coupling, characterised in that it is composed of at least three plates of metal or of other hard material such as wood, the thickness of which is slightly less than the width of a median groove in the coupling in which an expansion joint or seal is seated, and the surface area of which is sufficient to ensure that, while being positioned inside the groove, they extend beyond the internal diameter of the pipes to be coupled together, these plates being fixed to corner pieces having two arms, generally of metal, and identical in number to the plates, the magnitude of the angle inscribed inside the two arms of said corner pieces being determined in such a way that it is possible to align one arm of one corner piece with one arm of an adjacent corner piece, and is further composed of means enabling an extension and a contraction to be exerted in succession and progressively on each of the arms of mutually aligned corner pieces, such means enabling one of said arms to be progressively separated from the other at the time of positioning of the plates in the groove of the coupling and conversely enabling said arms to be progressively brought together in order to withdraw the plates from the groove of the coupling.

2. A device according to claim 1, characterised in that the extension and contraction means mounted on or between the aligned arms of the two adjacent corner pieces is a tie bar with screw threads of opposite pitch or a screw-jack or a hydraulic jack.

3. A device according to claim 1, characterised in that the inscribed angle between the two arms of each corner piece is 60° for three plates, 90° for four plates, 120° for six plates, and so on.

4. A device according to claim 1, characterised in that the external edge of the plates, that is to say that edge which is in contact with the base of the groove, is substantially of the same curvature as the base of the groove.

5. A method of coupling together pipes of diameter exceeding 45 cm by means of the device of claim 1, characterised in that, after the diameter of the circle within which the external edge of the plates is inscribed has been reduced to a value slightly less than the smallest internal diameter of the coupling, these plates are positioned opposite to the groove of the coupling, each corner piece is successively and progressively moved apart so as to introduce the plates into the groove, the coupling is driven onto the first pipe, the device is held in position, the second pipe is driven into the coupling, and each corner piece is successively and progressively brought together in such a way as to reduce the diameter of the circle within which the external edge of the plates is inscribed to a value slightly less than the internal diameter of the pipes.

* * * * *